United States Patent
Bailin

(10) Patent No.: US 7,392,469 B1
(45) Date of Patent: Jun. 24, 2008

(54) NON-INTRUSIVE COMMENTARY CAPTURE FOR DOCUMENT AUTHORS

(75) Inventor: Sidney C. Bailin, Washington, DC (US)

(73) Assignee: Sidney Bailin, Washington, DC (US)

(*) Notice: Subject to any disclaimer, the term of this patent is extended or adjusted under 35 U.S.C. 154(b) by 449 days.

(21) Appl. No.: 10/847,622

(22) Filed: May 18, 2004

Related U.S. Application Data

(60) Provisional application No. 60/471,226, filed on May 19, 2003.

(51) Int. Cl.
*G06F 17/21* (2006.01)

(52) U.S. Cl. .................. 715/230; 715/201; 715/202; 715/203; 715/232; 715/233; 715/273

(58) Field of Classification Search ............. 715/501.1, 715/500.1, 512, 515, 526, 201–203, 230, 715/232, 233, 273
See application file for complete search history.

(56) References Cited

U.S. PATENT DOCUMENTS

| | | | |
|---|---|---|---|
| 5,197,052 A * | 3/1993 | Schroder et al. | 369/25.01 |
| 5,513,305 A | 4/1996 | Maghbouleh | |
| 5,784,286 A | 7/1998 | Hirose et al. | |
| 5,806,079 A | 9/1998 | Rivette et al. | |
| 6,389,434 B1 | 5/2002 | Rivette et al. | |
| 6,611,517 B1 * | 8/2003 | Malik | 370/353 |
| 6,665,490 B2 | 12/2003 | Copperman et al. | |
| 6,671,684 B1 | 12/2003 | Hull et al. | |
| 6,675,352 B1 | 1/2004 | Osaki et al. | |
| 2003/0074345 A1 * | 4/2003 | Baldwin et al. | 707/1 |
| 2003/0225989 A1 * | 12/2003 | Licalsi | 711/167 |
| 2005/0022114 A1 * | 1/2005 | Shanahan et al. | 715/513 |
| 2005/0188016 A1 * | 8/2005 | Vdaygiri et al. | 709/205 |

OTHER PUBLICATIONS

Horowitz et al, "WinWin: a System for Negotiating Requirements", Proc. 21st International Conference on Software Engineering, Los Angeles, California, May 16-22, 1999.
Conklin & Begeman, "gIBIS: A Hypertext Tool for Exploratory Policy Discussion", ACM Transactions on Office Information Systems, 6(4):303-331, Oct. 1988.
Bailin, "Software for Capturing Software-Design Rationale", NASA Tech Briefs, Sep. 2002, KSC-12339.

* cited by examiner

*Primary Examiner*—Stephen Hong
*Assistant Examiner*—Joshua D Campbell
(74) *Attorney, Agent, or Firm*—Browdy and Neimark

(57) ABSTRACT

A device for capturing commentary, rationale, and other explanatory information pertaining to a document in parallel with the authoring of the document itself. The document content is entered through a primary input device (100), typically but not restricted to keyboard and mouse, and the commentary is entered through a secondary input device (200) of a different medium, such as speech captured by a microphone. The comments are linked to the corresponding locations in the main document by a memory controller (300), which stores the linked structure in the computer memory (400) and sends it to an output device (500), typically but not restricted to a computer monitor display, for presentation of the annotated document to the operator.

20 Claims, 14 Drawing Sheets

```
/**
 * Respond to a user action.
 */
public void actionPerformed(ActionEvent e){
  String s = e.getActionCommand();
  //System.out.println(s + "\n");
  if (s.equals("Start")) {
    startButton.setEnabled(false);
    stopButton.setEnabled(true);
    driver.uiStart();
  }
  //         ─10000
  //
  // This is an example of a spoken comment that was automatically
  // inserted into a computer program source code at the location
  // immediately above the item that the programmer was editing
  // while speaking.
  //
  else if (s.equals("Stop")) {
    startButton.setEnabled(true);
    stopButton.setEnabled(false);
    driver.uiStop();
  }
  else if (s.equals("Pulse")) {
    driver.uiPulse();
  }
  else if (s.equals("Auto")) {
    startButton.setEnabled(true);
    stopButton.setEnabled(false);
    autoPulseIntervalLabel.setEnabled(true);
    autoPulseInterval.setEnabled(true);
    autoPulseIntervalButton.setEnabled(true);
    pulseButton.setEnabled(false);
    driver.uiAuto();
  }
```

FIG. 12

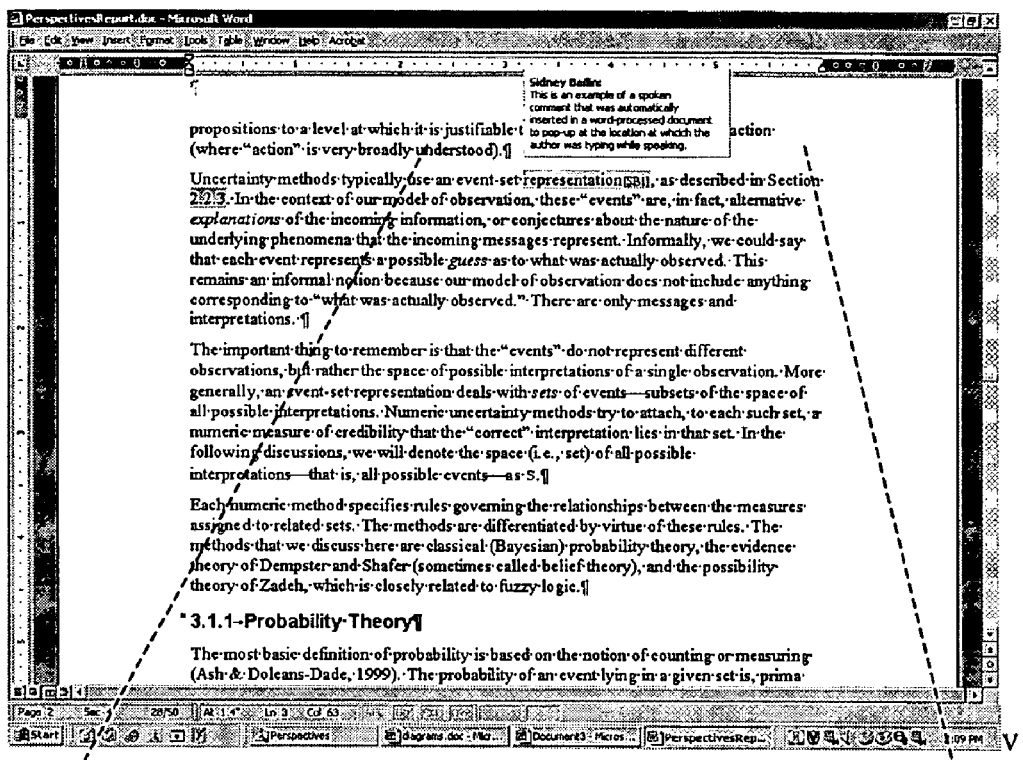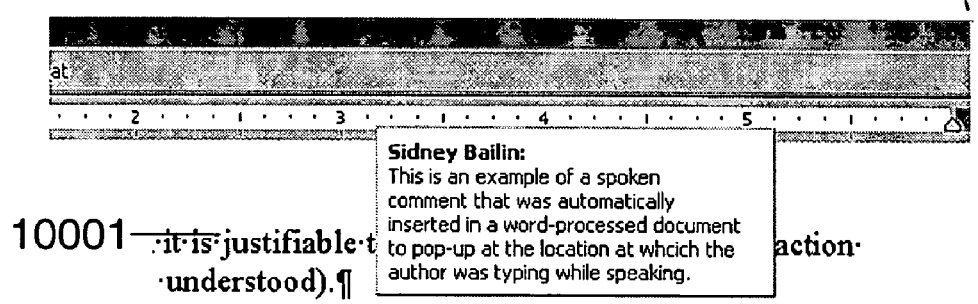
FIG. 13

NON-INTRUSIVE COMMENTARY CAPTURE FOR DOCUMENT AUTHORS

CROSS-REFERENCE TO RELATED APPLICATION

This application is entitled to the benefit of Provisional Patent Application Ser. No. 60/471,226 filed 2003 May 19.

FEDERALLY SPONSORED RESEARCH

Not Applicable

SEQUENCE LISTING OR PROGRAM

Not Applicable

BACKGROUND OF THE INVENTION

1. Field of Invention

This invention relates to rationale capture, specifically rationales for decisions, recommendations, plans, or specifications described in a document.

2. Background of the Invention

The problem that this invention addresses is the loss of contextual knowledge when decisions or recommendations are made and documented. The problem spans a wide range of activities, including

- engineering design
- software development
- business, organizational, and other forms of planning
- training and instruction Any time that a document is created in order to record and communicate a set of decisions or recommendations, there is also a need to record the rationale for the recommendations, explanations of the meaning and consequences of the recommendations, and commentary about the context in which they are made. This need applies both to decisions that have already been implemented, as in documenting software code, and to recommendations for future activity, as in designs, plans, and instructional documents.

The costs of not capturing rationale and related commentary are well known. When software must be maintained, if the rationales for its current design and code are missing, changes are likely to introduce errors that are costly to discover and fix. Insufficient documentation of alternatives that were considered and rejected can lead to maintainers "reinventing the wheel" by going down the already considered paths. When training manuals lack sufficient context, operators learning from them are likely to draw incorrect generalizations or conclusions, which in the case of safety- or life-critical systems can have catastrophic results. Budgets defined in a spreadsheet without comments providing the rationale for various estimates of income and expense can lead to poor management decisions if the conditions on which the estimates were based change.

Despite the known costs of not capturing rationale, it is frequently not done at all, or done as an afterthought. Knowledge workers tend to resist the requirement to document their rationale. This phenomenon can be understood in terms of the perceived cost of, and motivation for, the rationale capture activity. The cost of rationale capture can be measured in terms of the additional effort, or overhead, required of the document author. This perceived cost is correlated with the time required to document the additional information. Time is consumed in two ways, (1) the formulation of cogent rationales and (2) the recording process itself. The time required to perform these activities is a function of the cognitive, sensory, and motor demands that the activities place upon the author. The first activity, formulation of rationales, primarily imposes cognitive demand on the author. The second activity, recording the rationale, imposes not just cognitive but also sensory and motor demand. For example, the author must decide on the location, form, and style of the rationale documentation—relating it, for example, to other recorded rationales; this imposes cognitive demands. Sensory and motor demands are imposed by the tools, such as word processors or other computer-based tools, that are used to record the rationales.

Previous attempts to foster documentation of rationale and commentary include tools specifically intended for rationale capture, such as WinWin (Horowitz, E., Lee, J. H., and Lee, J. S., "WinWin: a System for Negotiating Requirements", *Proceedings of the 21st International Conference on Software Engineering*, Los Angeles, Calif., May 16-22, 1999, IEEE Computer Society Press, pages: 646-649); argument documentation systems such as Issue-Based Information System (Conklin, J. and Begeman, M. L., "gIBIS: A Hypertext Tool for Exploratory Policy Discussion", *ACM Transactions on Office Information Systems*, 6(4):303-331, October 1988), and U.S. Pat. No. 5,784,286; software program comment authoring and display tools such as that described in U.S. Pat. No. 5,513,305, and my own system entitled Better Elicitation and Communication of Arguments Underlying Software Engineering, or BECAUSE (NASA Tech Briefs, September 2002, KSC-12339); and general document authoring tools that provide for comments and annotations to a main text, such as those described in U.S. Pat. No. 5,806,079 and U.S. Pat. No. 6,389,434.

Experiences with such tools have demonstrated that even the slightest additional overhead, including the need to interact with a special rationale capture tool, can dissuade the author from recording rationales. Authors frequently intend merely to postpone the process, fully intending to return to the document later in order to record rationales and commentary. However, under time and task pressures, these intentions are often left unrealized.

The overhead disincentive has proven to be a problem with all of the tools identified above. Tools intended specifically for rationale capture, such as WinWin, gIBIS, and U.S. Pat. No. 5,784,286, provide ways of structuring and organizing rationale, but they operate separately from the authoring tools in which the product being explained is actually documented, e.g., the software code, planning spreadsheet, design specification, or instructional text whose rationale is being captured. The need to use a separate tool introduces enough overhead in the rationale capture process to dissuade most knowledge workers from bothering.

Some word processors and other document authoring tools, such as Microsoft Word, provide a comment or annotation mechanism whereby comments can be associated with particular locations in the main document text. The comments appear as separate items, for example as pop-up post-in notes, attached to the corresponding locations of the main text.

Even if a special comment-attachment or annotation feature is not available, ordinary text editors can be used to document rationale and provide comments on a main text. Various formatting conventions may be applied to distinguish commentary from the main text. For example, in software code, comments are explicitly marked by a sequence of characters that are reserved for this purpose by the programming language.

All of these authoring tools, however, suffer from the problem that commentary and main text are input through the same devices, usually keyboard and mouse, using the same motor skills of the operator. This means that the two activities, (1) authoring the main content of the document, and (2) providing comments, compete against each other for the attention of the operator. For example, typing numerical budget estimates into a spreadsheet competes with typing in explanations of the estimates. Under time pressure, it is the explanations that will most likely be omitted.

The BECAUSE system attempted to solve this problem by using two distinct input streams, one for the principal content of the document, which in that case was computer program source code, and one for the commentary. Specifically, BECAUSE captured spoken comments through a microphone, so that the software developer could type code and concurrently speak an explanation of what he was typing, and both inputs would appear in the resulting code, with the spoken words converted into program comments.

Despite the advance of capturing spoken comments, BECAUSE was limited in several respects that caused it to fall short of truly non-intrusive comment capture. BECAUSE makes essential use of a comment capture panel, which is a separate window in which the spoken comments are displayed after being converted from voice to text. This capture window is distinct from the window in which the source code is being created or edited. Its presence draws the user's attention away from the primary task of programming. Furthermore, comments are moved from the capture window to the program code only upon an explicit user command. This reduces the naturalness of the speech process and further shifts the user's attention away from the primary task of programming.

BECAUSE relies on the comment capture window and the explicit user command to begin insertion because it lacks any logic for maintaining and managing the links between comments and program code. Instead, it relies on the insertion of comments near the corresponding program code to establish the linkage visually. Visual proximity is a valid method for displaying the connection between a comment and the code to which it refers, but the lack of any additional link management forces BECAUSE to rely on explicit user insert commands to indicate when insertion should occur. This, in turn, forces the use of the separate comment capture window.

To see why this is so, consider what would happen if BECAUSE were to insert comments immediately into the program code, without waiting for a user command to do so. The result would be a display of the program code that was continually moving and changing visual shape. For example, the location at which the user was typing would suddenly shift down the screen when a comment was automatically inserted. This would constitute an unacceptably unstable user interface. It was to mitigate this problem that BECAUSE resorted to the explicit user command to insert the comment. This reliance on user commands, in turn, forces BECAUSE to present the captured comments in a separate window prior to insertion.

The limitations of BECAUSE in achieving truly non-intrusive comment capture stem from the absence of logic for maintaining and managing the links between comments and code. To improve upon this situation, the Commentary Capture Machine described in this application includes a memory controller whose job is precisely to maintain and manage the linkage between comments and primary content. This management is performed "behind the scenes" and is transparent to the user. The existence of the memory controller allows the machine to decouple the creation of comment-to-content links from the display of the comments. This, in turn, enables the machine to choose appropriate times to insert the comments, if insertion is the desired method for display. In addition, the machine provides alternative display mechanisms, including icons representing the presence of a comment, pop-up display of comments, and hyperlinks. The memory controller, in combination with the variety of display mechanisms, enables the machine to avoid the unstable display problem in a less intrusive, more transparent manner than BECAUSE.

The Commentary Capture Machine is distinguished by several advantages, for purposes of document commentary capture, over the invention described in U.S. Pat. No. 6,665,490. That invention provides a way to annotate recordings either during the recording process itself or while the recording is being played. The annotations in that invention, however, are manual, i.e., performed through handwriting or typing at a keyboard. In addition, that invention applies only to "recordings," which are defined as "information that is stored over time and can be replayed over time." By contrast, the Commentary Capture Machine described in this application facilitates comment capture by voice or other input means, for any form of computerized document. This includes documents where there is no direct correlation between elements of the document and their time-of-creation or time-of-display, and which therefore cannot be treated as recordings in the sense of U.S. Pat. No. 6,665,490.

The inventions described in U.S. Pat. No. 6,675,352 provides for voice annotations, but does not automatically attach the annotation to the document in an appropriate location, relying instead on explicit manually created "annotation commands." It therefore does not achieve the level of non-intrusiveness achieved by the Commentary Capture Machine. The invention described in U.S. Pat. No. 6,671,684 provides for simultaneous physical and electronic highlighting of portions of a document, where the electronic highlighting is achieved by electronically scanning the manual highlighting. This too requires manual input of the highlighting, thus falling short of the level of non-intrusiveness achieved by the Commentary Capture Machine. In addition, the Commentary Capture Machine captures comments and annotations in general, i.e., verbal statements explaining the primary content of the document, rather than just highlights, which may be considered a specific form of annotation.

OBJECTS AND ADVANTAGES

Accordingly, besides the advantages of two concurrent input streams, one for program code and the other for program comments, provided by BECAUSE, several objects and advantages of the present invention are:

(a) to work with a variety of document types, including word processed documents, web documents, spreadsheets, program source code, plain text, and drawings;

(b) to work with a variety of input devices for each input stream, not limited to keyboard and mouse for primary input and microphone for secondary input;

(c) to work with a variety of presentation devices, not limited to a computer display monitor, but also including printing and projection devices;

(d) to be usable by one or more operators, for example, one who enters the primary input, and another who enters the commentary;

(e) to partition both inputs and correlate the related parts with each other automatically, thereby enabling the operator to concentrate on the primary task of content creation;

(f) to provide a variety of methods for correlating and linking comments to primary content, including near-simultaneity of input or edit, similarity of content, and explicit user direction;

(g) to insert commentary automatically into the document, without requiring a directive from the operator, thereby enabling the operator to concentrate on the primary task;

(h) to delay comment insertion when necessary in order to avoid confusing changes to the display occurring independently of user control;

(i) to use non-intrusive presentation mechanisms, such as character highlighting, color coding, small visual icons, or small textual cues to indicate the presence of a comment whose full insertion is being delayed;

(j) to provide a variety of comment presentation methods, including insertion of the comment into the document, insertion of an icon representing the comment into the document, pop-up of a frame containing the comment when the mouse is moved over the corresponding primary content, and hyperlinks from portions of the primary content to the related comments.

Still further objects and advantages will become apparent from a consideration of the ensuing description and drawings.

SUMMARY

The commentary capture invention provides a simple means for content authors to add comments, annotations, explanations, and rationale to their content during the content authoring process, without being distracted from the primary task of content authoring.

DRAWINGS—FIGURES

FIG. 12 shows an example of displaying secondary input as comments within a program source code.

FIG. 13 shows an example of displaying secondary input as pop-up comments within a word-processed document.

DRAWING—REFERENCE NUMERALS

Figure 1:
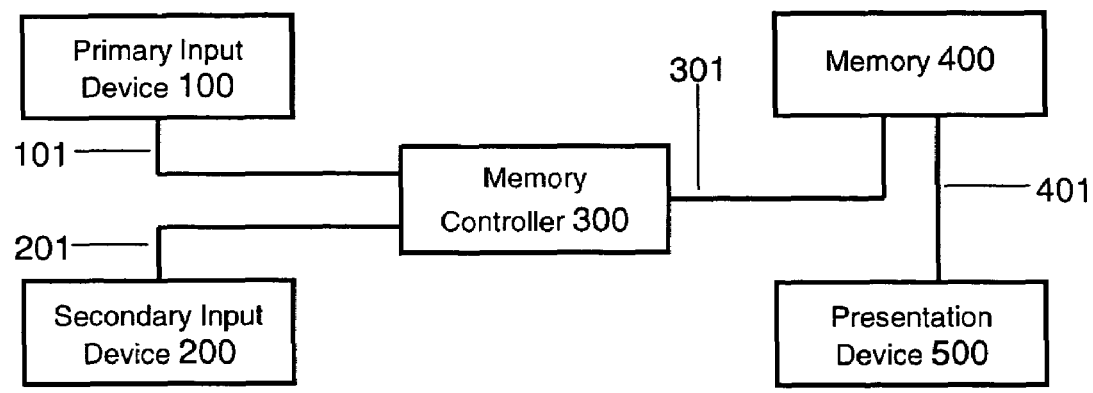
FIG. 1 shows the essential components of a non-intrusive commentary capture device.

In the drawings, embodiments of components are given the same number as the general component but with an alphabetic suffix. A connection between one component and another is given a number one greater than the first component.

100 primary input device
100a keyboard and mouse
100b digitizing tablet and stylus
101 interface between primary input device 100 and memory controller 300
101a interface between keyboard and mouse 100a and memory controller 300
101b interface between digitizing tablet and stylus 100b and memory controller 300
200 secondary input device
200a microphone
200b speech-to-text convertor
200c keyboard and mouse for secondary input
201 interface between secondary input device 200 and memory controller 300
201a interface between microphone 200a and memory controller 300
201b interface between keyboard and mouse 200c and memory controller 300
202 interface between microphone 200a and speech-to-text converter 200b
203 interface between speech-to-text converter 200b and memory controller 300
300 memory controller
301 interface between memory controller 300 and memory 400
302 interface between memory controller 300 and prompter 600
400 memory
401 interface between memory controller 400 and presentation device 500
401a interface between memory controller 400 and display monitor 500a
500 presentation device
500a display monitor
600 prompter
601 interface between prompter 600 and display monitor 500a
602 interface between prompter 600 and audio speaker 700
700 audio speaker
1001 operation receive primary input
1002 operation store in memory
1003 operation display primary input
1004 operation receive secondary input
1005 choice start of secondary input part?
1006 operation note primary input caret location
1007 store secondary input in memory
1008 choice end of secondary input part?
1009 operation determine related primary part
1010 operation create link
1011 operation update display
2001 operation start timer
2002 operation check for secondary input
2003 choice input received?

2004 exit process receive secondary input
2005 choice silence threshold exceeded?
2006 operation elicit secondary input
3001 choice time-based link?
3002 operation retrieve saved primary input caret location
3003 operation obtain primary input part at caret location
3004 choice content-based link?
3005 operation obtain primary input part with closest-related content
3006 operation obtain primary input part at designated location
4001 choice display as insert?
4002 choice text annotation?
4003 operation display secondary text near primary content
4004 operation display icon for binary annotation near primary content
4005 choice display as pop-up?
4006 operation highlight primary content to indicate presence of annotation
4007 operation display annotation as pop-up upon mouse-over highlighted area
4008 operation display hyperlink to annotation in primary content
4009 operation display annotation when operator selects hyperlink
10000 comment inserted in program source code
10001 pop-up comment in word-processed document
10002 audio annotation in word processed document
10003 graphic annotation in word-processed document
10004 pop-up comment in graphic

DETAILED DESCRIPTION—FIGS. 1-3—PREFERRED EMBODIMENT

A preferred embodiment of the commentary capture machine is illustrated in FIG. 1. The machine consist of two input devices (primary input 100 and secondary input 200), a memory controller 300 containing logic to correlate the primary and secondary inputs with each other, a computer memory 400 for storing both primary and secondary inputs as well as the links between them, and an output or presentation device 500 for displaying or presenting the combined or linked primary and secondary input as an annotated document.

The primary input device is the means by which the human operator creates the primary content of a document. The primary content is the essential content of the document. The secondary input device is the means by which the human operator comments on, explains, or annotates the primary input.

Figure 2:
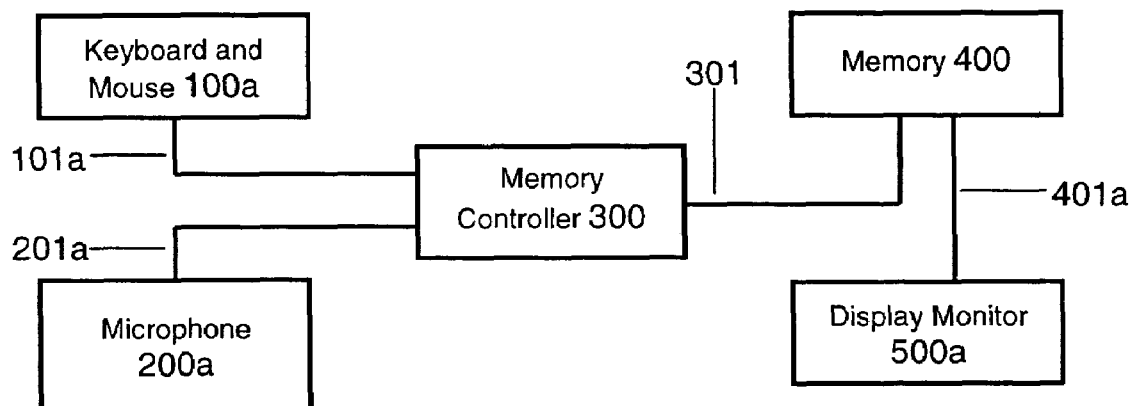
FIG. 2 shows an embodiment in which the primary input means is a keyboard and mouse, secondary input means is a microphone, and the presentation means is a computer display monitor.
Figure 3:
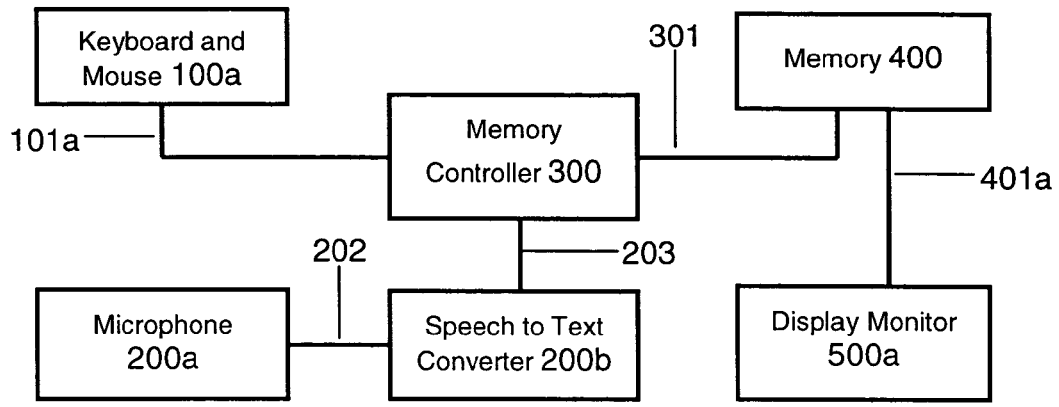
FIG. 3 shows a similar embodiment in which secondary input is converted from speech to text.

The primary and secondary input devices are capable of receiving input concurrently. In order for a single human operator to provide two inputs concurrently, the two inputs must be in different modes, such as text typed at a keyboard for the primary input, and speech received through a microphone for the secondary input. FIG. 2 shows a machine in which the primary input 100a is received through a keyboard and mouse, and in which the secondary input 200a is received through a microphone. FIG. 3 shows a similar machine in which speech received through the microphone 200a as secondary input is further converted to text by a speech-to-text converter 200b for storage in the machine and in the document being created by the operator.

As shown is FIGS. 1-2, the memory controller 300 is connected to the primary input device 100 (or 100a) by means of an interface 101 (or 101a). The memory controller 300 is connected to the secondary input device 200 (or 200a) by means of an interface 201 (or 201a). As shown in FIG. 3, if the machine includes a speech-to-text converter 200b, it is the speech-to-text converter 200b that is connected to the microphone 200a by an interface 202. In that case, the memory controller 300, instead of being directly connected to the microphone 200a, is instead connected to the speech-to-text converter 200b by an interface 203.

The memory controller 300 segments the primary and secondary inputs into parts, paragraphs, sections, or segments, and correlates parts of the secondary input or commentary with parts of the primary input or main content. The memory controller determines which parts of the primary input are correlated with which parts of the secondary input by correlating parts of the two inputs that were received at the same or overlapping time, or by correlating parts of the two inputs that are related to each other in content. The memory controller creates links between the correlated parts of the primary and secondary inputs, and stores these links in memory 400 along with the primary and secondary inputs.

The presentation device 500 shows the operator the document content and commentary. As shown in FIG. 2, a typical embodiment of the presentation device is a computer display monitor 500a which displays the document as it is being created or edited. The presentation device 500 (or 500a) obtains the contents and annotations of the document, as well as the links between annotations and main contents, from the memory 400 via an interface 401 (or 401a).

FIG. 4—ADDITIONAL EMBODIMENT

Figure 4:
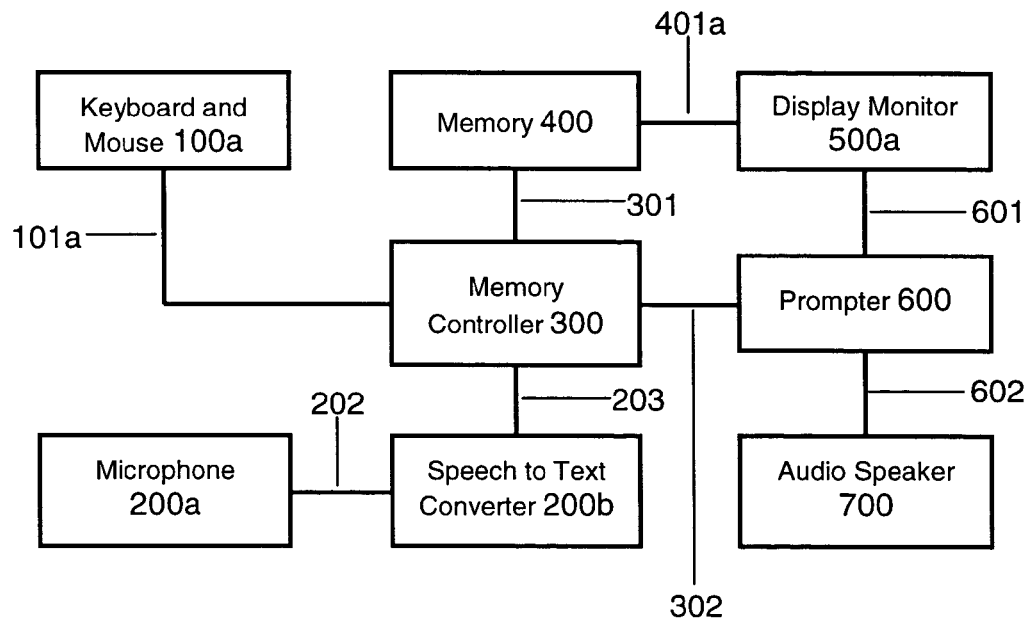
FIG. 4 shows an additional embodiment containing a means of prompting the operator for secondary input.

FIG. 4 shows a similar embodiment which further includes a prompter, which is a device containing logic for prompting the operator to provide commentary or secondary input when no commentary has been received through the secondary input device 200 for a period of time longer than a designated interval I. The prompter determines whether a prompting message is necessary by examining the links and timing information provided by the memory controller 300 to the prompter through an interface 302. The prompter issues a message to the operator suggesting that the operator provide a commentary on the primary information being entered into the machine. The prompter may issue this message through the display monitor 500a, to which the prompter is connected by an interface 601, or through a second output device such as an audio speaker 700, to which the prompter is connected by an interface 602.

FIGS. 5-6—ALTERNATIVE EMBODIMENTS

In the preferred embodiment, the primary input device comprises a keyboard and mouse 100a, and the secondary input device is a microphone 200a together with a speech-to-text converter 200b.

Figure 14:
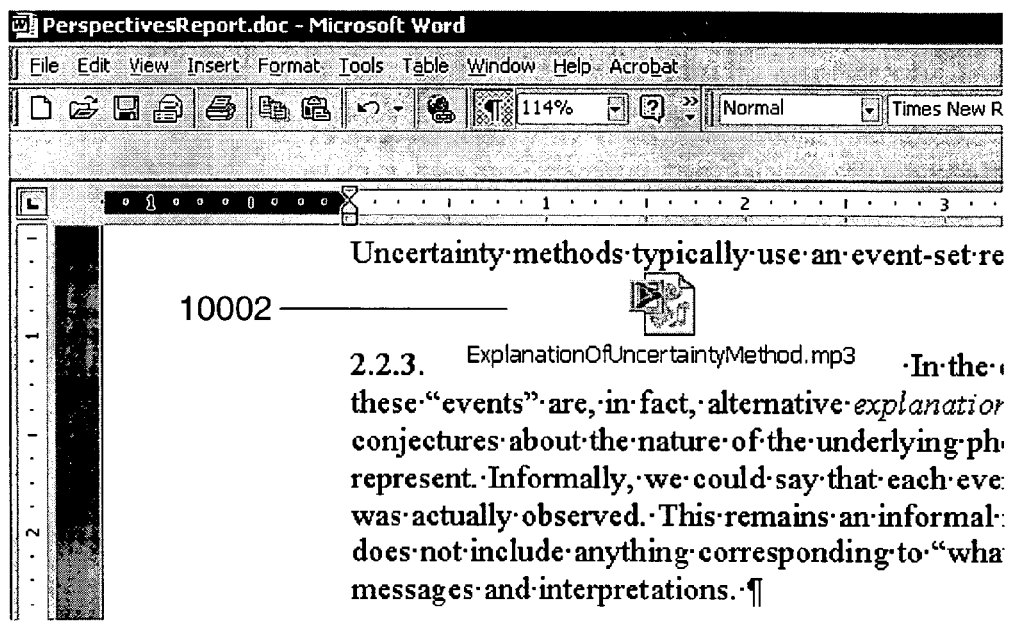
FIG. 14 shows an example of presenting secondary input as an audio annotation in a word-processed document.

Alternative embodiments may be realized by using different primary and secondary input devices. For example, FIG. 2 showed an embodiment in which the secondary input consists of a microphone 200a without a speech-to-text converter. In that case, the commentary or annotation is stored as binary sound information using an encoding such as wav or mp3, rather than as text. An example of this type of annotation 10002 is shown in FIG. 14.

Figure 5:
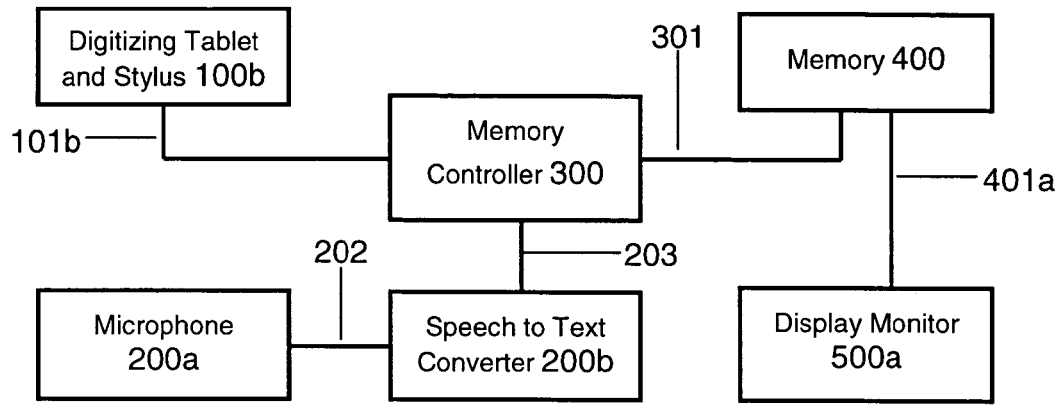
FIG. 5 shows an alternative embodiment in which the primary input means is a digitizing tablet and stylus.

FIG. 5 shows an embodiment in which the primary input device is a digitizing tablet and pen 100b for drawing diagrams.

Figure 6:
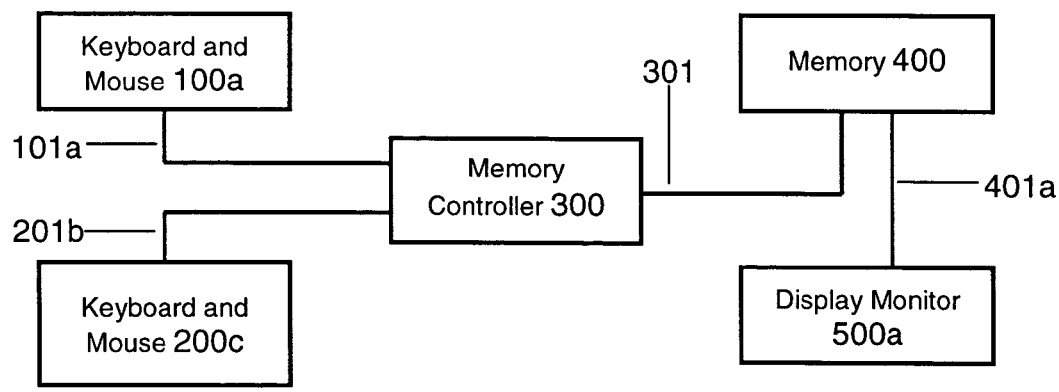
FIG. 6 shows an alternative embodiment in which the secondary input means is a keyboard and mouse.

Although in the preferred embodiment the primary and secondary input devices are of different type, thus enabling a single human operator to use both devices at the same time (for example, by typing and speaking simultaneously), alternative embodiments are possible in which the primary and secondary input devices are of the same type, and the machine is operated by more than one person. For example, FIG. 6 shows an embodiment in which the primary and secondary input devices each consist of a keyboard and mouse 100*a* and 200*c*. The resulting machine could be used by two operators working together, one using the primary input device to enter the main document content, and the other using the secondary input device to annotate the main content.

OPERATION—FIGS. 7-11

The machine processes two concurrent input data streams (the primary and secondary inputs), segments the secondary input stream into parts (such as sentences or paragraphs), and correlates segments of the secondary input stream with locations in the primary input stream. A segment of the secondary input stream is treated as a comment on, explanation of, or annotation to the corresponding location in the primary input stream. In order to process the two input streams concurrently, the operation consists of two main processes, Receive and Process Primary Input, FIG. 7, and Receive and Link Secondary Input, FIG. 8.

Figure 7:
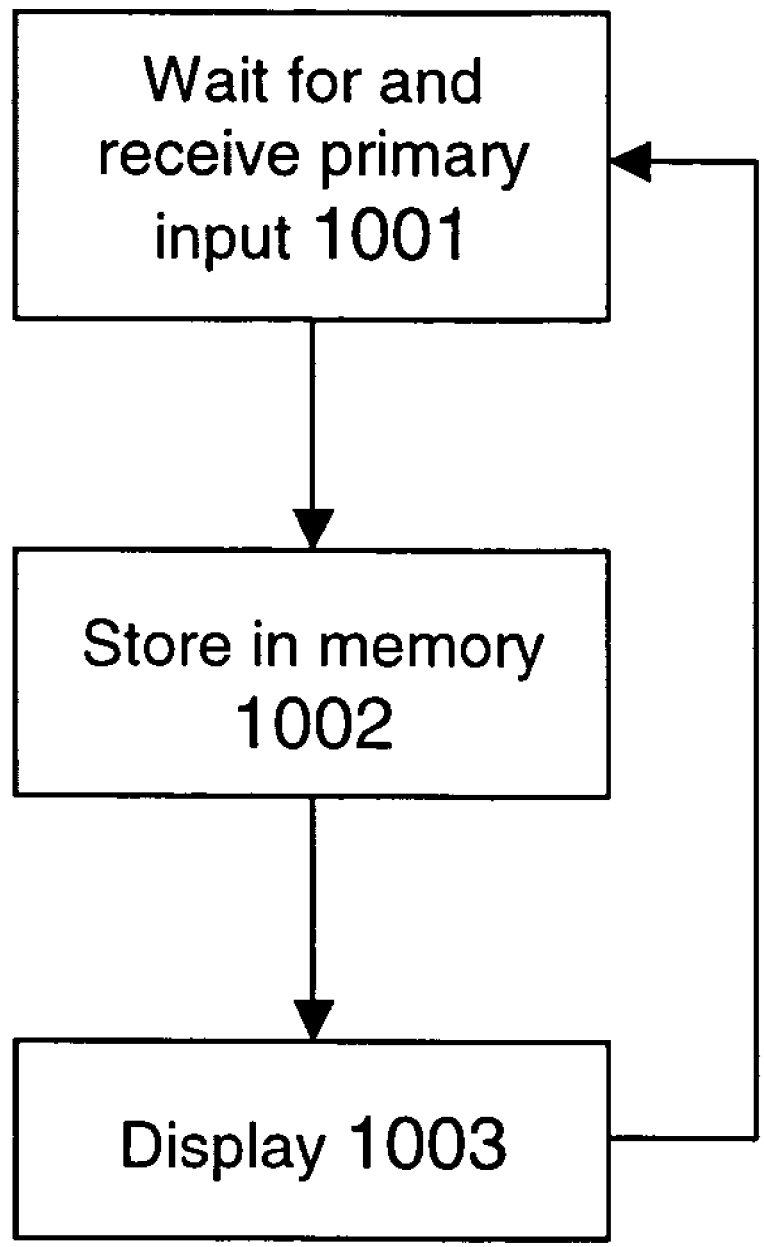
FIG. 7 shows the flow of operation for receiving and processing primary input.

Receive and Process Primary Input, FIG. 7, operates as a document editor, such as a word processor. This process may be performed by an off-the-shelf document editor. Input, which may be text (e.g., typed through a keyboard) or binary information (e.g., entered via mouse operations or another type of input device, such as a digitizing tablet and stylus), is received 1001 from the operator through the primary input means 100, stored 1002 in the computer's memory, and displayed 1003 to the operator along with the rest of the document. The primary input may consist of corrections or changes to previous primary input. This is handled according to the operating conventions of the document editor, which may be an off-the-shelf component.

Figure 8:
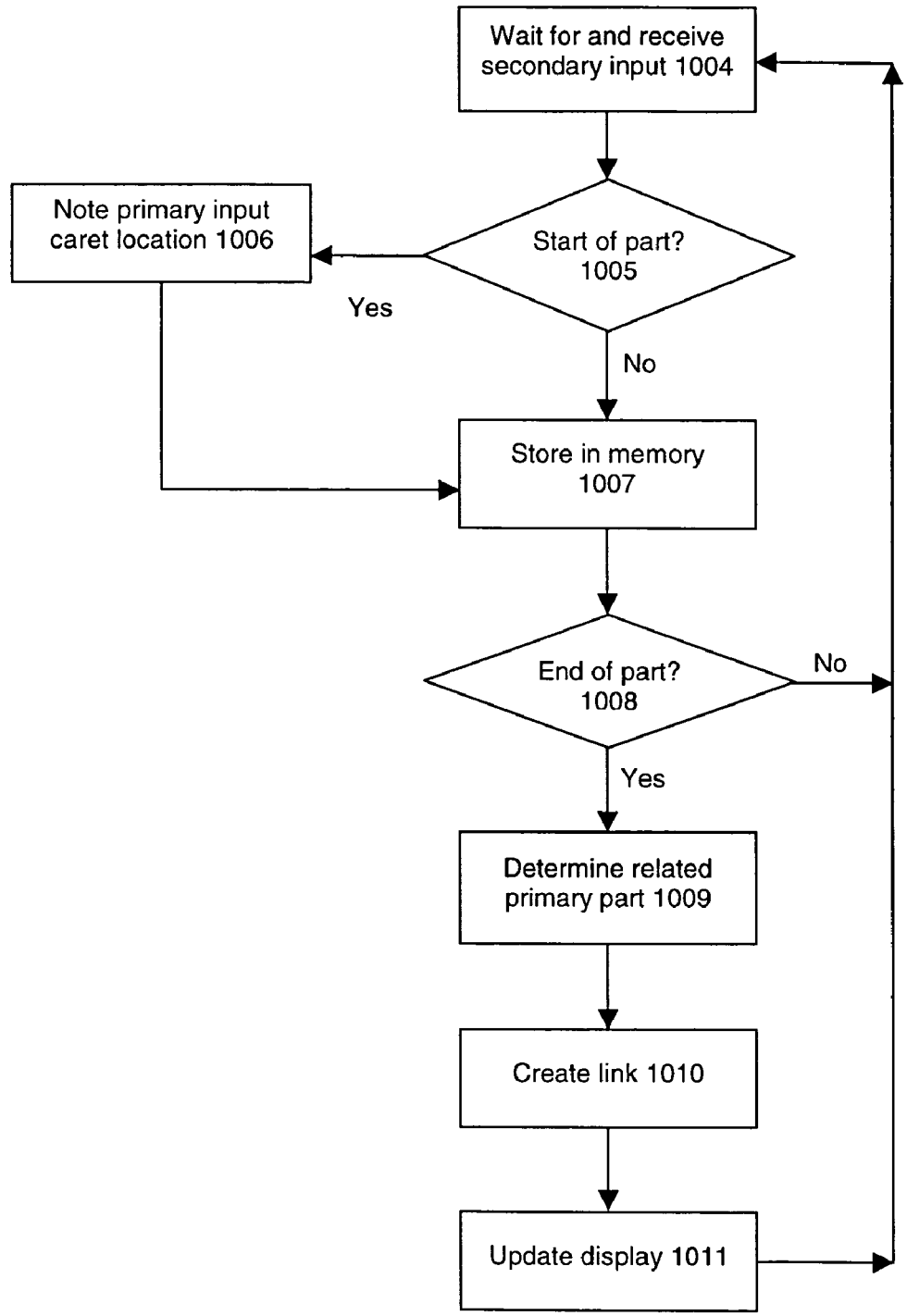
FIG. 8 shows the flow of operation for receiving secondary input and linking it to primary input.

Receive and Link Secondary Input, FIG. 8, performs the unique comment-correlation functions of the machine. Commentary input is received 1004 from the operator through the secondary input means 200, such as a microphone 200*a*. The memory controller 300 determines whether this input is the start of a new segment or part of the commentary, or rather a continuation of an ongoing part of the commentary 1005. The logic applied by the memory controller 300 to determine this includes the following tests:

Timing—a pause in the receipt of secondary input exceeding a specified time threshold indicates the start of a new part Shift in location—if the operator has started to edit a different location in the primary document, this indicates the start of a new part of the commentary Delimiting phrases—if the previous secondary input ended with a phrase or pattern that is recognized by the memory controller as delimiting a part of the secondary input, the immediately subsequent secondary input starts a new segment. The delimiting pattern can be a specific phrase, such as "Stop," a speech pattern such as the drop in pitch that typically ends a sentence (such criteria are used in existing speech-to-text converters), or other patterns.

If the memory controller 300 determines that a new segment or part of the secondary input has started, it records the location of the primary document that the operator is currently editing 1006. This location is known as the caret location. The memory controller 300 is able to determine this location because all input, both primary and secondary, is controlled by the memory controller. If an off-the-shelf document editor is being used to process the primary input, the memory controller interacts with the document editor to obtain this information.

The memory controller 300 then stores 1007 the secondary input in memory. It then determines whether the secondary input just received constitutes the end of a part or segment 1008. This is determined using the same criteria listed above for recognizing the start of a segment. Specifically, if a delimiting pattern is recognized, or if the caret location of the primary document has shifted by more than a specified threshold distance (measured in words or other units), then the end of the just-stored secondary input is recognized. If the start of a new part of secondary input was noted in steps 1005 and 1006, then the end of the most recently previously stored secondary input is recognized. If the memory controller 300 recognizes the end of a segment, it determines 1009 the correspond part of the primary input, links 1010 the secondary input part to the primary input part, and updates the display of the document with the annotation 1011. The process then continues by waiting for subsequent secondary input from the operator.

Figure 9:
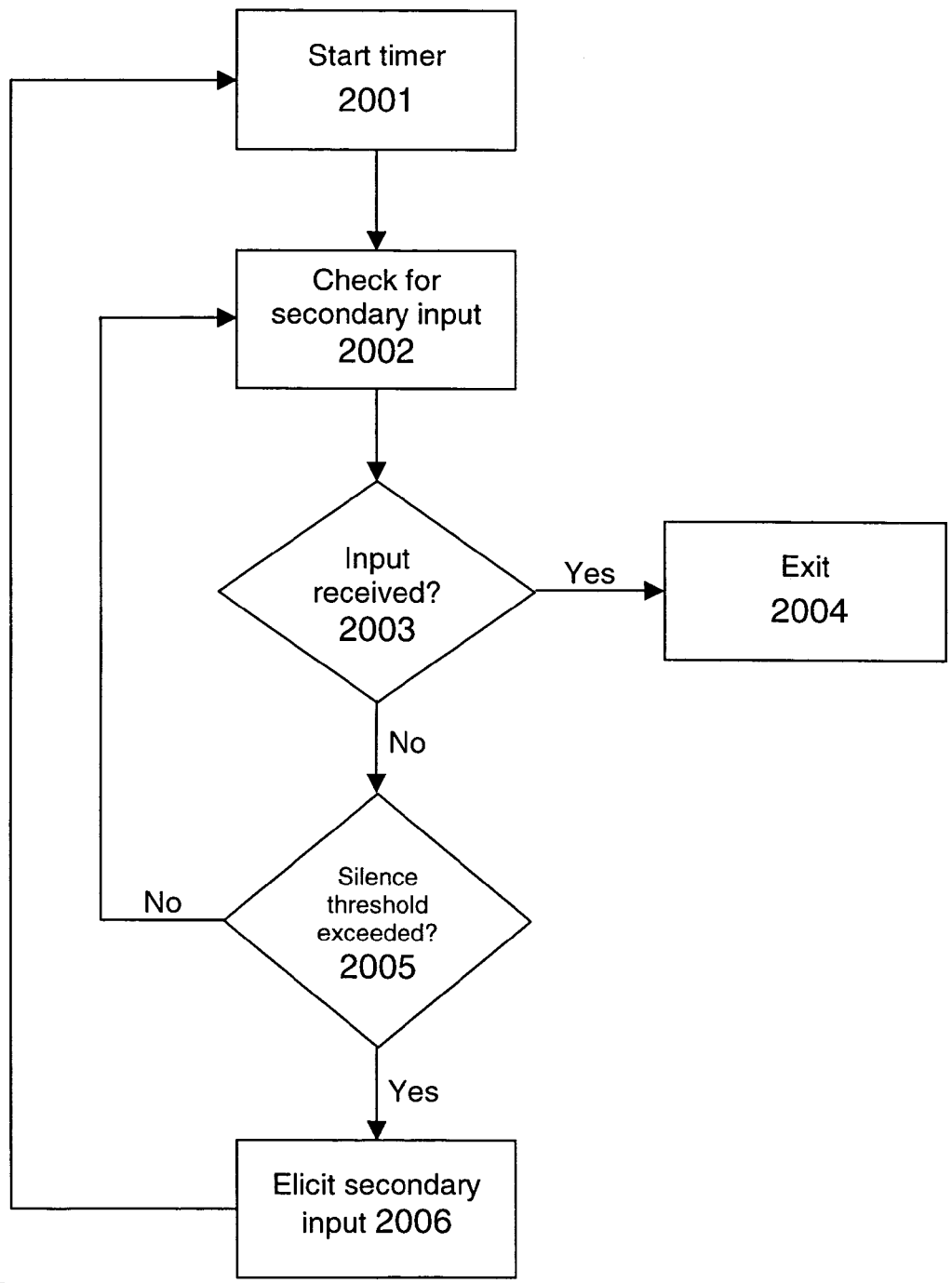
FIG. 9 shows the detailed flow of operation for receiving secondary input.

FIG. 9 shows the details of the sub-process Receive Secondary Input 1006. The machine starts a timer 2001 in order to limit the amount of time spent waiting for secondary input before actively prompting the operator. It then checks 2002 for the presence or absence of new input through the secondary input device. If input has been received 2003, the machine exits 2004 the Receive Secondary Input process and proceeds to the next step of Receive and Link Secondary Input, FIG. 8. If input has not been received 2003, the machine checks 2005 whether the threshold time interval for waiting for secondary input has been exceeded. If not, the machine returns to step 2002 to check again for secondary input. If the wait threshold has been exceeded, the machine elicits 2006 secondary input from the operator, resets the timer 2001, and begins the process again.

The machine elicits secondary input 2006 by displaying a message on the computer monitor, or displaying a visual cue on the monitor, or issuing a sound or a spoken prompt through the computer's speaker. Any standard computer-based operator notification mechanism can be used for this purpose.

Figure 10:
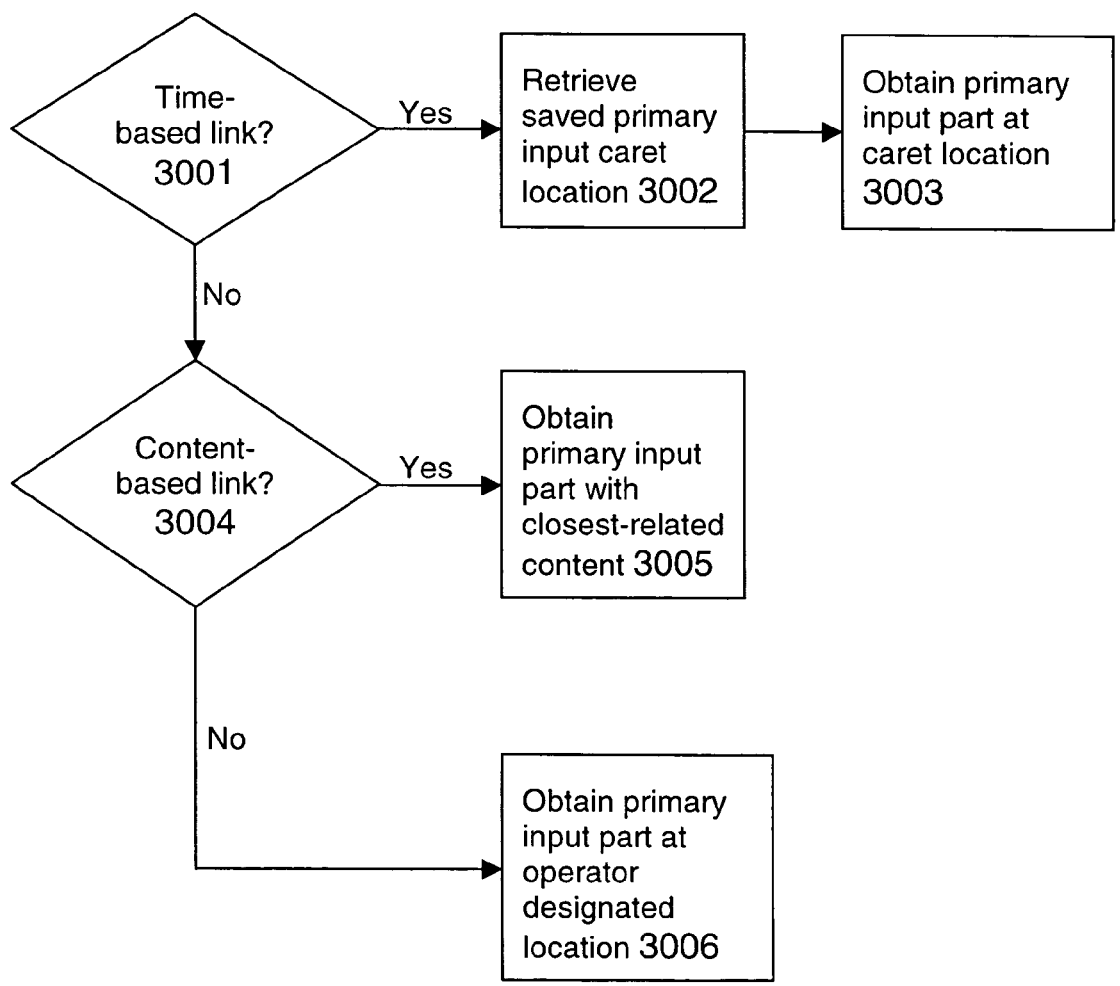
FIG. 10 shows the detailed flow of operation for determining the primary input part to which a secondary input part will be linked.

FIG. 10 shows the details of the sub-process Determine Related Primary Part 1011. There are three methods, operator selectable, for determining the part or location of the primary input to which a part of the secondary input corresponds:

Time co-occurrence
Content similarity
Operator-specified

The time co-occurrence method 3001 associates a comment or annotation, i.e., a part of the secondary input, with that part or location of the primary input that was being edited or created at the same time, or close to the same time, that the comment was input through the secondary input device. The machine determines this location in the primary input by retrieving 3002 the caret location that was stored in step 1006 of FIG. 8. The machine then associates 3003 the comment with the part of the primary input, e.g., the sentence, paragraph, section, programming statement, or other segment that contains this caret location. Alternatively, the machine can associate the comment with the caret location itself. This method can be used if, for example, there is no explicit segmentation of the primary input into parts.

The content similarity method 3004 associates a comment with that part of the primary input whose content is closest in topic to the content of the comment. Various means exist for determining the closeness of content between blocks of text, including, for example, Latent Semantic Analysis. The machine uses one or more such means to find 3005 a part of the primary input that is most closely related in topic to the comment, or part of the secondary input, itself.

If neither the time co-occurrence or content similarity method is used, then the machine obtains 3006 an identification of the relevant part of the primary input from the operator. This information may be conveyed by the operator by an explicit identification at the beginning or end of the comment, or by pointing with the mouse, or by any other user-interface means.

Figure 11:
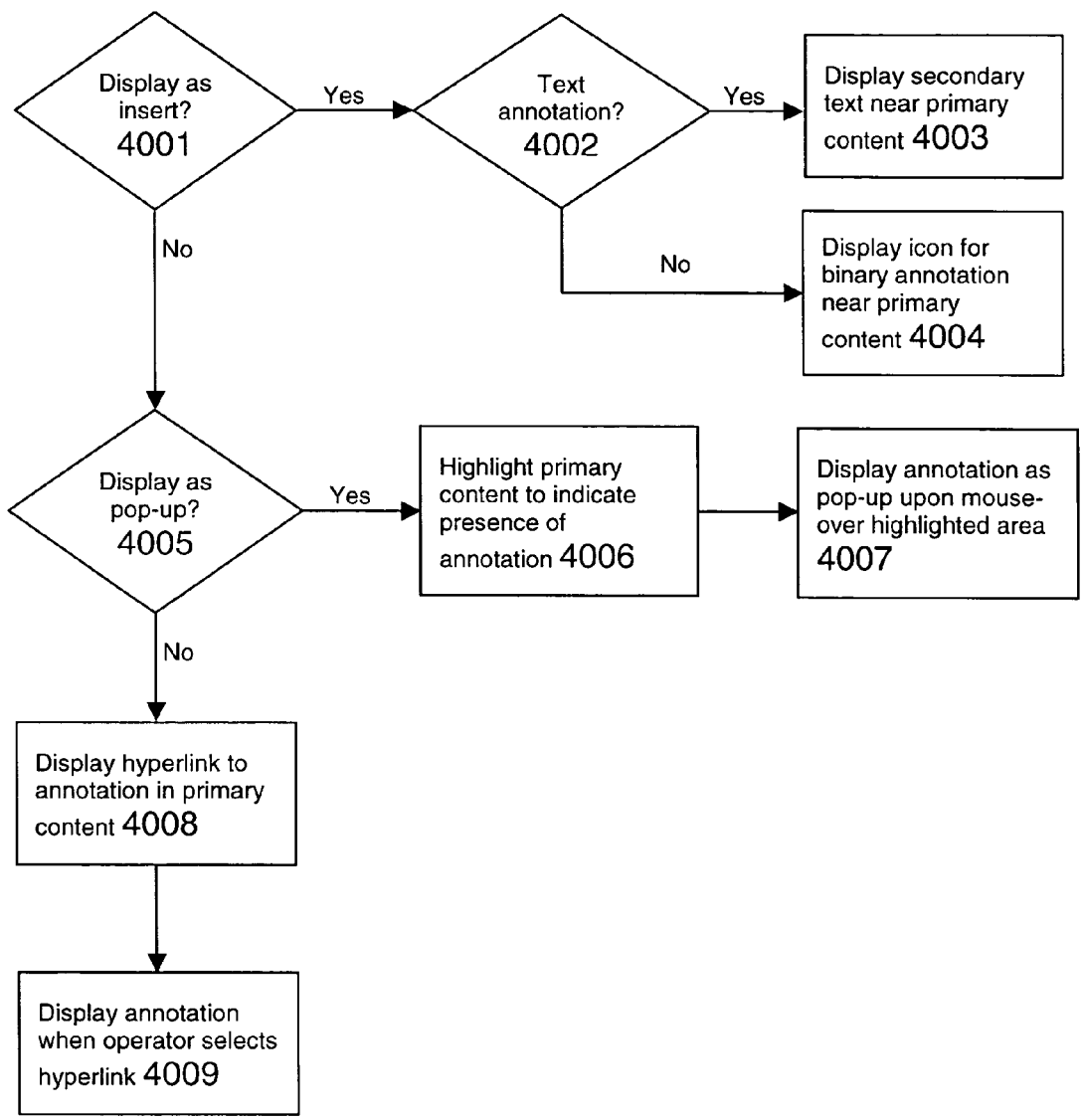
FIG. 11 shows the detailed flow of operation for displaying the commentary (secondary input) linked to the primary input.

FIG. 11 shows the details of the sub-process Update Display 1011. The details of the sub-process concern the choice of display method, which is selectable by the operator. The available display methods include insert pop-up hyperlink The machine first determines 4001 whether the comment should be displayed as an insert within the document at the corresponding location of the primary input. This method may be used, for example, to insert comments into program code, as in FIG. 12, or to insert multi-media annotations, such as audio or drawings, as in FIGS. 14 and 15, into the primary document.

If the comment is to be displayed as an insert within the document, the machine then determines 4002 whether the annotation consists of text or another form of information. In the case of text, the comment text is displayed 4003 near the primary input to which the comment corresponds. In the case of non-text information, such as audio or drawing, an icon representing the annotation is displayed 4004 near the primary input to which the annotation corresponds.

If the comment is not to be displayed as an insert, the machine determines 4005 whether it should be displayed as a pop-up item. This method may be used, for example, in word processed documents, where comments pop-up in separate display boxes when the mouse is moved over the location in the primary input to which the comment corresponds, as in FIG. 13. If the comment is to be displayed as a pop-up item, the machine highlights 4006 the location of the primary input to which the comment corresponds, in order to indicate the presence of a comment. For example, this location of the primary input may be displayed in a special color, or a marker may be inserted at the location to indicate the presence of the comment. When the operator moves the mouse over this location of the primary input, the machine displays 4007 the content of the comment as a pop-up item. In a word processed document, the machine may accomplish this by using the features of the word processor provided for this purpose.

If the comment is not to be displayed as an insert nor as a pop-up, the machine displays it 4008 via a hyperlink. The hyperlink is inserted according to the formatting requirements of the type of document being annotated. For example, in a web document, a hyperlink is created by inserting appropriate HTML tags. In a word-processed document, a hyperlink may be created using the features of the word processor that are provided for that purpose. The presence of the hyperlink is indicated by highlighting the corresponding location in the primary document. In the case of a web document, the highlighting is achieved through the web browser used to display the document. In the case of a word processed document, the highlighting is achieved through the word processor's display mechanism. When the operator selects the hyperlink, for example by clicking on the highlighted area with the mouse, the machine, using the available features of the web browser, word processor, or other display means, displays 4009 the content of the annotation.

FIGS. 12-17 show various display methods for the combined primary and secondary information. In FIG. 12, the primary input is computer source code and the commentary consists of source comments 10000, which are distinguished from the operational code by a comment marker. Different computer programming languages use different comment markers. In FIG. 12, the programming language is Java and the comment marker consists of two forward slashes, //. This choice of programming language is just an example, and the equivalent process of inserting comments can be performed by the machine with any programming language.

FIG. 13 shows an example in which the primary input is a word-processed document, and the commentary consists of word-processed comments, which are attached by the word processor to specific locations in the document, under the direction of the commentary capture machine. In this example, the presence of a comment is indicated by a small visual cue, consisting of the initials of the comment's author enclosed in square brackets. The text of the comment itself is displayed in a pop-up box 10001 when the operator passes the mouse over the location to which the comment has been attached.

FIG. 14 shows an example in which the primary input is a word-processed document, and the commentary consists of an audio file, such as captured speech. The presence of the comment is indicated by an icon 10002 that represents an audio file, inserted into the document at the location to which the comment is attached. The operator can listen to the comment by opening the audio file, for example, by double-clicking the mouse on the icon.

Figure 15:
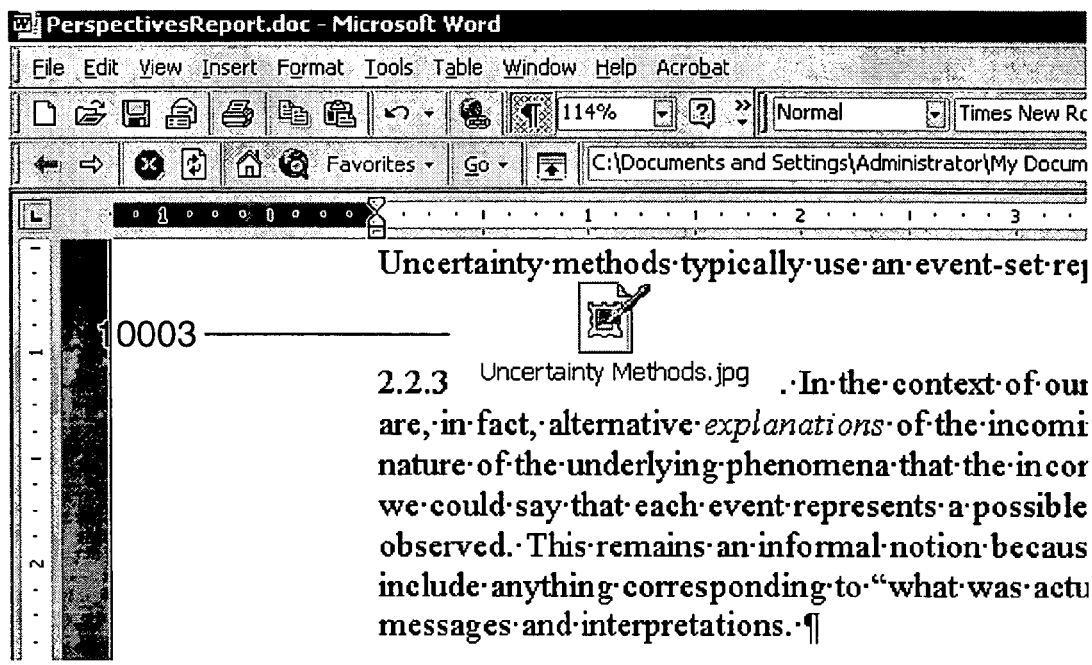
FIG. 15 shows an example of displaying secondary input as a graphic annotation in a word-processed document.

FIG. 15 shows an example in which the primary input is a word-processed document, and the commentary consists of a drawing or graphic. The presence of the comment is indicated by an icon 10003 that represents a graphics file, inserted into the document at the location to which the comment is attached. The operator can view the drawing by opening the graphics file, for example, by double-clicking the mouse on the icon.

Figure 16:
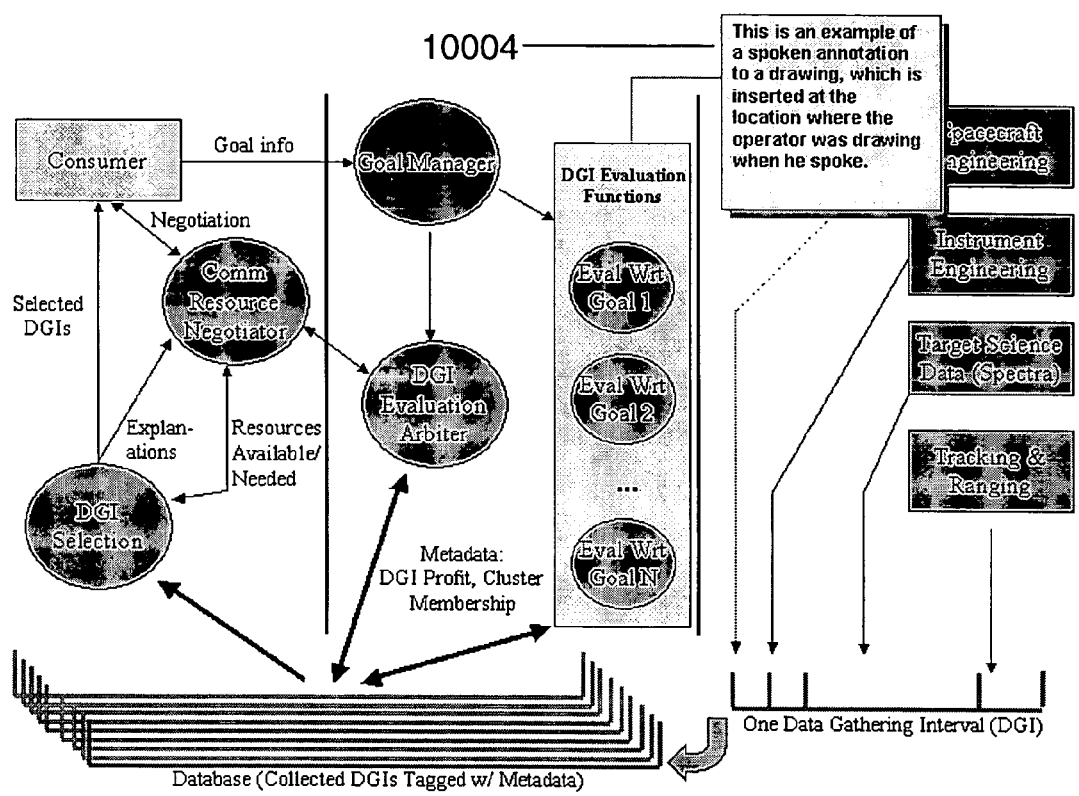
FIG. 16 shows an example of displaying secondary input as a textual annotation in a graphic.

FIG. 16 shows an example in which the primary input is a drawing, and the commentary consists of spoken annotations that are converted by the machine to text through a speech-to-text converter. The text of the comment is displayed in a pop-up box 10004 when the operator passes the mouse over the location to which the comment has been attached.

Figure 17:
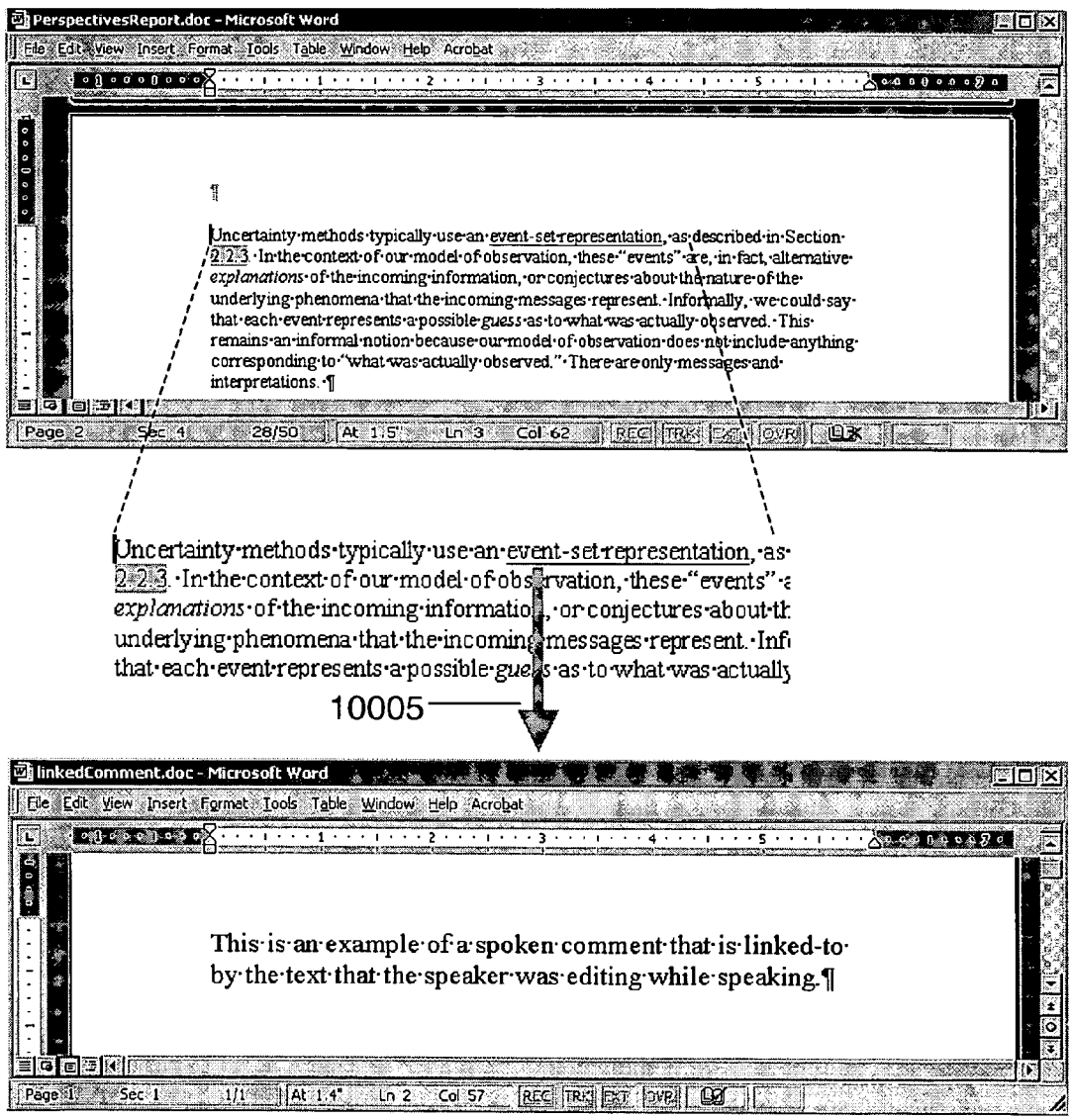
FIG. 17 shows an example of displaying secondary input via a hyperlink within a document.

FIG. 17 shows an example in which the primary input is a web-based document, which might be a word processed document, and the commentary consists of text or other media, such as audio or graphics, contained in a separate document. The presence of the comment is indicated in the primary document by means of a hyperlink 10005, which is visually indicated in the primary document using a standard web-browsing mechanism such as a colored font and/or underlining. When the operator clicks the mouse on the hyperlink indicator, the document browser, which might be a word processor, presents the document in which the comment is located, by displaying the comment in text or graphics, or playing an audio comment through the computer's speaker, or some other presentation means.

CONCLUSION, RAMIFICATIONS, AND SCOPE

Accordingly, the reader will see that this commentary capture invention can be used to non-intrusively record explanatory information, rationale, and other forms of annotations to a document being created or edited, and to correlate those comments with the parts of the document to which they refer. The parallel input streams, one for the main content of the document and the other for commentary, using different modalities such as typing for main input and voice for commentary, allow the operator of the invention to provide commentary without interrupting the primary task of authoring or editing the document. The invention has the additional advantages in that it eliminates the need to add comments after-the-fact, i.e., by returning to the document after it has been authored or edited, the need to perform this as a separate task being one of the main reasons why comments and rationale are frequently not provided it improves the quality of authored documents by encouraging the inclusion of rationales and other explanatory information, the absence of such information being a serious problem in software designs and programs, as well as in other documents where decisions are recorded the automatic correlation performed by the memory controller relieves the operator of the need to state explicitly where comments should be attached the timer-based input process relieves the operator of the need to state when a comment is finished the timer-based secondary input elicitation process encourages the operator to provide commentary when none has been forthcoming for an exceedingly long period of time the display process provides the operator with visual indicators of the presence of comments, as soon as the comments have been input, without disrupting the format, positioning or layout of the primary document as it is being worked on Although the description above contains many specificities, these should not be construed as limiting the scope of the invention but as merely providing illustrations of some of the presently preferred embodiments of this invention. For example, the primary and secondary input devices can be virtually any type of computer input device; the primary and secondary input may consist of text or binary information such as audio, drawings, etc.; the machine can employ a variety of document creation and display tools, such as a word processor, a drawing program, a web browser, etc., to carry out some of the steps described under Operation; the machine may or may not provide speech-to-text conversion; the machine may or may not provide elicitation of secondary input; any of a variety of presentation means other than a computer monitor, such as a printer, audio speaker, projector, etc., may be used to present the annotated document; a variety of means to determine content similarity between comments and parts of the primary input may be employed, etc.

Thus the scope of the invention should be determined by the appended claims and their legal equivalents, rather than by the examples given.

I claim:

1. A method of reducing the effort required to annotate a computer document with comments, comprising:
   (i) providing a memory which is able to store a series of characters and binary-information in said memory,
   (ii) providing a primary character and binary-information input means configured to enable a human operator to create and store a document consisting of characters and binary-information in said memory,
   (iii) storing said document in said memory,
   (iv) providing a secondary character and binary-information input means configured to enable the human operator to create comments consisting of characters and binary-information that describe parts of said document while said human operator simultaneously continues uninterrupted to use said primary input means to create said document, such that the human operator does not have to pause the secondary input means to use the primary input means to create said document, or pause the primary input means to use the secondary input means to create comments,
   (v) providing a memory controller which will:
      (a) segment said secondary series of characters and binary information into individual comments,
      (b) determine parts of said document to which each said comment refers, said determination being performed automatically and based on execution of program steps by the memory controller to interpret information input by the human operator and timing of said input of said information using the primary character and binary-information input means and the secondary character and binary-information input means,
      (c) determine the locations in said memory of said parts of said primary information to which said parts of said secondary information refer,
   (vi) storing said comments in said memory,
   (vii) storing links in said memory between said comments and said parts of said document to which said comments refer, such that said comments are automatically assigned to portions of said document without a human operator having to separately identify said portions of said document to which said comments should be assigned, and
   (viii) providing a document output means operatively connected to said memory configured to enable the human operator to view said document and said comments, whereby said links between said comments and said parts of said document are visually apparent.

2. The method of claim 1 wherein said secondary input means comprises a microphone configured to enable the human operator to input said comments by speaking.

3. The method of claim 2 wherein said secondary input means includes a means of converting speech signals to text.

4. The method of claim 1 wherein said document output means presents said parts of said secondary information contiguous with, adjacent to, or near to said parts of said primary information to which said parts of said secondary information refer.

5. The method of claim 1 wherein said memory controller automatically and based on execution of program steps by the memory controller to interpret information input by the human operator and timing of said input of said information using the primary character and binary-information input means and the secondary character and binary-information input means, links a comment to the part of said document which was input by the human operator at substantially the same time as said comment.

6. The method of claim 1 wherein said memory controller will:
   (ix) automatically and based on execution of program steps by the memory controller to interpret information input by the human operator and timing of said input of said information using the primary character and binary-information input means and the secondary character and binary-information input means, perform content analysis of said comment and said document,
   (x) automatically and based on execution of program steps by the memory controller to interpret information input by the human operator and timing of said input of said information using the primary character and binary-information input means and the secondary character and binary-information input means, link said comment to a part of said document whose content is most closely related to said content of said comment.

7. The method of claim 1 wherein said document is a computer program source code and said memory controller stores said comments as computer program comments subject to the rules for placement of said comments in the language of said computer program automatically and based on execution of program steps by the memory controller to interpret information input by the human operator and timing of said input of said information using the primary character and binary-information input means and the secondary character and binary-information input means.

8. The method of claim 1 providing an input controller which will prompt a human operator for commentary at appropriate times when said secondary information is not being provided through said secondary input means.

9. The method of claim 1 wherein said memory controller determines the start point and end point of each said comment within said secondary input based on execution of program steps by the memory controller to interpret information input by the human operator and timing of said input of said information using the primary character and binary-information input means and the secondary character and binary-information input means, to identify said start points and said end points of said comments.

10. The method of claim 9 wherein said memory controller determines said start points and said end points of said comments by identifying pauses and delimiting patterns in said secondary input.

11. A machine for reducing the effort required to annotate a computer document with comments, comprising:
   (i) providing a memory which is able to store a series of characters and binary-information in said memory,
   (ii) providing a primary character and binary-information input means configured to enable a human operator to create and store a document consisting of characters and binary-information in said memory,
   (iii) storing said document in said memory,
   (iv) providing a secondary character and binary-information input means configured to enable the human operator to create comments consisting of characters and binary-information that describe parts of said document while said human operator simultaneously continues uninterrupted to use said primary input means to create said document, such that the human operator does not have to pause the secondary input means to use the primary input means to create said document, or pause the primary input means to use the secondary input means to create comments,
   (v) providing a memory controller which will:
      (a) segment said secondary series of characters and binary information into individual comments,
      (b) determine parts of said document to which each said comment refers, said determination being performed automatically and based on execution of program steps by the memory controller to interpret information input by the human operator and timing of said input of said information using the primary character and binary-information input means and the secondary character and binary-information input means,
      (c) determine the locations in said memory of said parts of said primary information to which said parts of said secondary information refer,
   (vi) storing said comments in said memory,
   (vii) storing links in said memory between said comments and said parts of said document to which said comments refer, such that said comments are automatically assigned to portions of said document without a human operator having to separately identify said portions of said document to which said comments should be assigned, and
   (viii) providing a document output means operatively connected to said memory configured to enable the human operator to view said document and said comments, whereby said links between said comments and said parts of said document are visually apparent.

12. The machine of claim 11 wherein said secondary input means comprises a microphone configured to enable the human operator to input said comments by speaking.

13. The machine of claim 12 wherein said secondary input means includes a means of converting speech signals to text.

14. The method of claim 11 wherein said document output means presents said parts of said secondary information contiguous with, adjacent to, or near to said parts of said primary information to which said parts of said secondary information refer.

15. The machine of claim 11 wherein said memory controller automatically and based on execution of program steps by the memory controller to interpret information input by the human operator and timing of said input of said information using the primary character and binary-information input means and the secondary character and binary-information input means, links a comment to the part of said document which was input by the human operator at substantially the same time as said comment.

16. The machine of claim 11 wherein said memory controller will:
   (ix) automatically and based on execution of program steps by the memory controller to interpret information input by the human operator and timing of said input of said information using the primary character and binary-information input means and the secondary character and binary-information input means, perform content analysis of said comment and said document,
   (x) automatically and based on execution of program steps by the memory controller to interpret information input by the human operator and timing of said input of said information using the primary character and binary-information input means and the secondary character and binary-information input means, link said comment to a part of said document whose content is most closely related to said content of said comment.

17. The machine of claim 11 wherein said document is a computer program source code and said memory controller stores said comments as computer program comments subject to the rules for placement of said comments in the language of said computer program automatically and based on execution of program steps by the memory controller to interpret information input by the human operator and timing of said input of said information using the primary character and binary-information input means and the secondary character and binary-information input means.

18. The machine of claim 11 providing an input controller which will prompt a human operator for commentary at appropriate times when said secondary information is not being provided through said secondary input means.

19. The machine of claim 11 wherein said memory controller determines the start point and end point of each said comment within said secondary input based on execution of program steps by the memory controller to interpret information input by the human operator and timing of said input of said information using the primary character and binary-information input means and the secondary character and binary-information input means, to identify said start points and said end points of said comments.

20. The machine of claim 19 wherein said memory controller determines said start points and said end points of said comments by identifying pauses and delimiting patterns in said secondary input.

* * * * *